Patented Jan. 19, 1926.

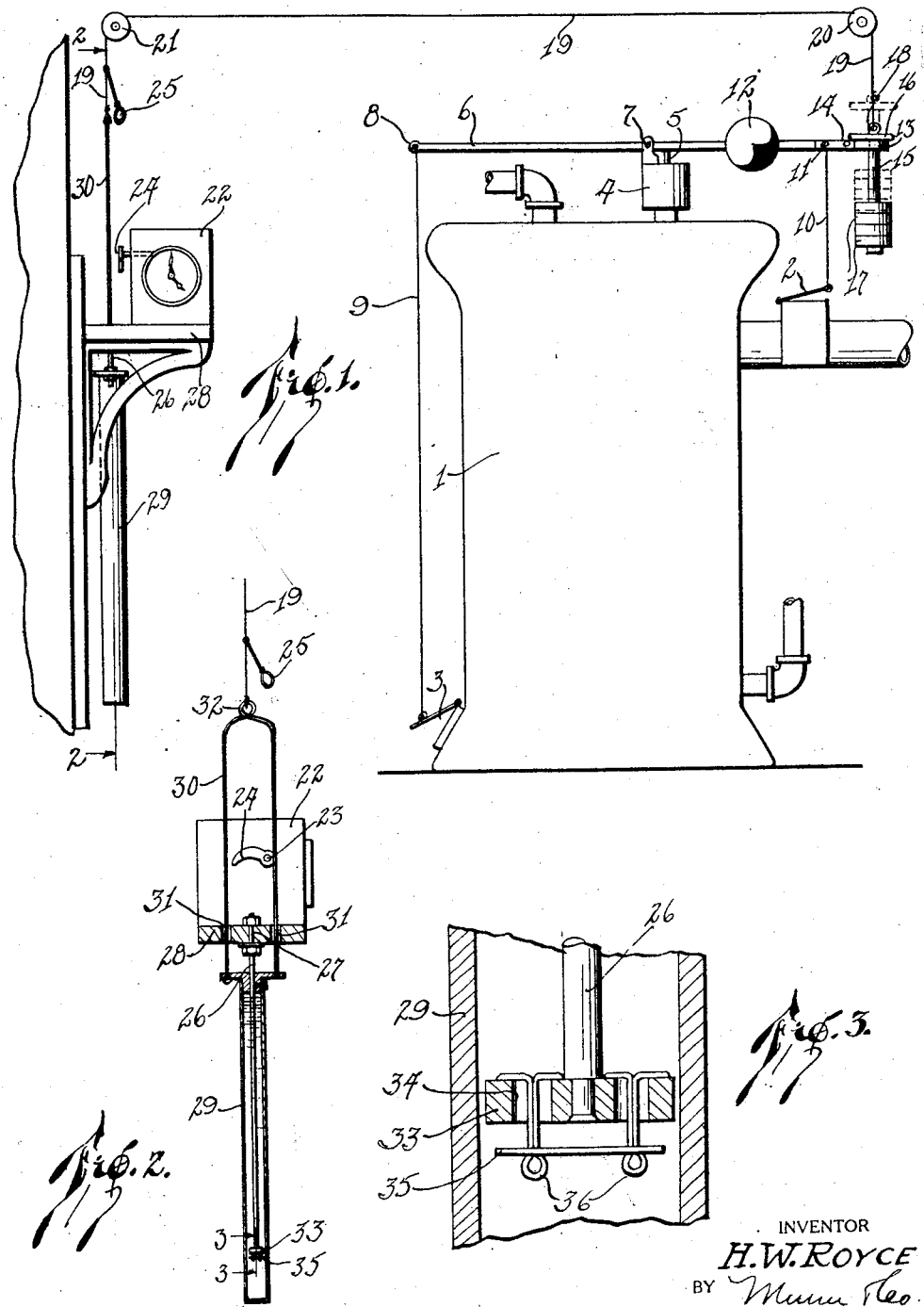

1,570,082

UNITED STATES PATENT OFFICE.

HOWARD W. ROYCE, OF CHICAGO, ILLINOIS.

TIME-CONTROLLED REGULATOR FOR HEATING SYSTEMS.

Application filed April 13, 1925. Serial No. 22,845.

*To all whom it may concern:*

Be it known that I, HOWARD W. ROYCE, a citizen of the United States, and a resident of Chicago, in the county of Cook and State of Illinois, have invented a new and useful Improvement in Time-Controlled Regulators for Heating Systems, of which the following is a full, clear, and exact description.

My invention relates to improvements in time controlled regulators for heating systems, and it consists in the combinations, constructions and arrangements herein described and claimed.

An object of my invention is to provide a time controlled regulator of the character described by means of which additional weights may be engaged with a weight-actuated temperature regulator in a heating system at a predetermined time, such as just before daybreak.

A further object of my invention is to provide a time controlled regulator of the character described which is intended for use with the standard type of weight-actuated temperature regulator and which does not interfere with the regular functioning of the regulator when the time controlled mechanism is inoperative.

A further object of my invention is to provide a time controlled regulator of the character described in which the amount of additional weight placed upon the weighted arm of the regulator may be varied at will.

A further object of my invention is to provide a time controlled regulator of the character described in which means is provided for preventing the too sudden application of the additional weights to the weighted arm, which might damage the delicate mechanism of the thermostatic element employed for actuating the weighted arm.

Other objects and advantages will appear in the following specification, and the novel features of the invention will be particularly pointed out in the appended claims.

My invention is illustrated in the accompanying drawings forming part of this application, in which—

Figure 1 is an elevation of an embodiment of my invention,

Figure 2 is an enlarged sectional view along the line 2—2 of Figure 1, and

Figure 3 is an enlarged sectional view along the line 3—3 of Figure 2.

In carrying out my invention I make use of the ordinary type of hot water boiler 1 having a fire box (not shown), a damper 2, and a draft door 3.

A thermostatic element 4 of standard construction having a piston 5 which is adapted to rise and fall with the rise and fall of temperature of the element 4 is connected with the boiler 1 and disposed at the top of the boiler as shown in Figure 1. This thermostatic element 4 usually consists of an expandible compartment to which the inner end of the piston 5 is secured, and a volatile liquid passing within the compartment which when heated causes the compartment to expand and lift the piston 5.

A weighted lever 6 is pivotally mounted at 7 upon the casing of the thermostatic element 4 at a point intermediate the length of the lever.

One end 8 of the lever 6 is connected by means of a chain 9 with the draft door 3 of the boiler. A chain 10 is connected with the damper door 2 at one end and at its opposite end to a point 11 adjacent to the outermost end of the boiler.

That end of the lever 6 between the portion 11 and the fulcrum 7 has a weight 12 adjustably disposed thereon. The weight 12 is intended to resist the elevation of the piston 5.

From the description of the device thus far it is apparent that an increase in temperature of the boiler will cause the piston 5 to elevate against the force of the weight 12 and close the draft door 3 and open the damper door 2. This will diminish the intensity of the fire and the temperature of the boiler will lower until the piston 5 lowers sufficiently to permit the weighted lever 6 to again open the draft door and close the damper door. Thus a uniform temperature is maintained in the system.

It is the custom at the present time to vary the position of the weight 12 on the lever 6 to obtain a rise or fall in the temperature of the boiler, and consequently the radiators are disposed through the building and connected with the device. This custom is particularly inconvenient when it is desirable that the temperature of the boiler shall be low at night and higher during the daytime. My present invention provides a means for adding weight to the lever 6 during the day and for removing that weight during the night. The application of the weights takes place at a predetermined time.

This device consists in a rigid loop-shaped member 13 which is secured by bolts 14 to the outermost end of the lever 6 adjacent to the portion 11.

A rod 15 is projected through the loop-shaped portion 13 and has a cross bar 16 at the upper end thereof which is larger than the diameter of the loop-shaped portion 13. Thus the bar 16 may not pass through the loop.

A plurality of weights 17 are disposed upon the rod 15 and may be removed at will, or additional weights 17 applied.

The rod 15 is connected by means of a ring 18 at the upper end thereof to a cable 19 which is run over a pulley 20 above the boiler and extends to a second pulley 21 above a time-actuated release device shown at the left of Figure 1.

This device consists in an alarm clock 22 of the ordinary type having a shaft 23 connected with the alarm mechanism thereof which is released and may rotate in a clockwise direction when the alarm goes off. The shaft 23 has a hook-shaped member 24 at the outermost end thereof which is adapted to engage with a ring 25 carried by the cable 19 adjacent to its outer end.

When the ring 25 is in engagement with the hook 24 the weights 17 are lifted entirely free of the loop 13 and the lever 6 is free to rotate to its full extent.

A dash pot for preventing the sudden movement of the cable 19 and thus the sudden application of the weights 17 to the lever when the ring 25 is disengaged from the hook 24, consists in a stationary piston shaft 26 which is secured at 27 to the shelf 28 upon which the alarm clock mechanism 22 is disposed. A movable cylinder 29 having a yoke 30 at the upper end thereof which is projected through openings 31 of the shelf 28 is provided.

The upper end 32 of the yoke 30 is connected to the outermost end of the cable 19. The cylinder 29 is closed at its lower end and is filled with oil. The lower end of the piston shaft 26 has a piston 30 which has its peripheral walls at a slight distance from the inner wall of the cylinder 29. This piston 30 has a pair of openings 34 therethrough having their axes parallel with the piston shaft 26.

A plate 35 slightly smaller in diameter than the piston 33 is disposed beneath the piston and is normally held at a slight distance therefrom by the provision of hangers 36 which are projected through the openings 34 and through openings provided in the plate 35. When the dash pot cylinder 29 is drawn upwardly this plate 35 is moved against the piston to close the mouth of the openings 34 and the oil must seek its way between the piston and the cylinder wall.

When the cylinder is drawn downwardly in resetting the device the plate 35 falls and oil passes through the openings 34.

From the foregoing description of the various parts of the device the operation thereof may be readily understood. Let us assume that the weight 12 is adjusted upon the lever 6 so that the thermostatic element 4 will so control the lever as to maintain the temperature in the heating system as it is required during the night and during mild weather. Obviously more heat is required during the day than at night, when the heating system is employed in dwellings and the like.

In setting my improved time controlled regulator prior to retiring or prior to that time during which only the weight 12 is employed in connection with the lever 6 for operating the system, the ring 25 is engaged with the hook 24 of the clock mechanism. The alarm is set to go off at, let us assume, five o'clock in the morning.

During the night the temperature in the heating system will remain at a low degree and will be maintained so by the thermostatic element 4 and the weighted lever 6.

When the alarm mechanism actuates, however, at the predetermined hour, the shaft 23 will revolve and the ring 25 will be released from the hook 24. The weights 17 will move slowly downwardly until the bar 16 engages with the loop 13, whereupon the force of the weights 17 is added to the force of the weights 12, and together the forces act upon the lever 6 to resist movement of the piston rod 5. Hence temperature in the system will rise, since it takes more heat to actuate the lever 6 so as to close the draft door and open the damper door.

Movement of the weights 17 will be slow, because of the provision of a dash pot construction consisting chiefly of the cylinder 29, piston 33—35 and the piston rod 26.

The temperature of the heat in the system, when the weights 17 are in engagement with the lever 6 may be varied by adding or taking away certain of the weights to and from the rod 15.

I claim:

1. The combination with a heating system having a thermostatic control device including a weighted actuating lever for accelerating and diminishing the intensity of the heat source in said system, of a weight, means for normally holding said weight out of engagement with said weighted lever, and time controlled means for releasing said first named means whereby said weight may engage with said lever and augment the force exerted by the weight normally disposed on said lever.

2. The combination with a heating system having a thermostatic control device including a weighted actuating lever for accelerating and diminishing the intensity of the heat source in said system, of a rod, a plurality of weights removably disposed on said rod, said rod being constructed so as to engage with said weighted lever whereby the weights thereon may augment the force of the weight normally on said lever, means for maintaining said rod with its weights out of engagement with said lever, and time controlled means for releasing said first named means whereby said rod may move into engagement with said lever.

HOWARD W. ROYCE.